United States Patent
Wu

(10) Patent No.: US 9,004,828 B2
(45) Date of Patent: Apr. 14, 2015

(54) STROKE CONTROLLER FOR A KEY DUPLICATOR

(76) Inventor: Kuo-Shen Wu, Taipei (TW)

( * ) Notice: Subject to any disclaimer, the term of this patent is extended or adjusted under 35 U.S.C. 154(b) by 834 days.

(21) Appl. No.: 13/282,566

(22) Filed: Oct. 27, 2011

(65) Prior Publication Data

US 2012/0141221 A1    Jun. 7, 2012

(30) Foreign Application Priority Data

Dec. 2, 2010   (TW) ............................... 99223385 U

(51) Int. Cl.
    *B23C 3/35*    (2006.01)

(52) U.S. Cl.
    CPC ......... *B23C 3/35* (2013.01); *Y10T 409/300952* (2015.01)

(58) Field of Classification Search
    CPC .......................................... B23C 3/35
    USPC ...................................... 409/81–83
    IPC ........................................ B23C 3/35
    See application file for complete search history.

(56) References Cited

U.S. PATENT DOCUMENTS

| | | | | |
|---|---|---|---|---|
| 693,258 A | * | 2/1902 | Gibson | 220/263 |
| 1,573,210 A | * | 2/1926 | Whidden | 137/636.2 |
| 1,742,631 A | * | 1/1930 | Beisser | 409/81 |
| 2,508,122 A | * | 5/1950 | Mooney | 248/404 |
| 3,012,350 A | * | 12/1961 | Wold | 42/94 |
| 3,022,578 A | * | 2/1962 | Seibel | 356/626 |
| 3,094,039 A | * | 6/1963 | Spain | 409/82 |
| 3,161,097 A | * | 12/1964 | Judelson | 82/48 |
| 3,180,161 A | * | 4/1965 | Wasner | 74/89.17 |
| 3,232,547 A | * | 2/1966 | Thiede et al. | 242/563.1 |
| 4,614,465 A | * | 9/1986 | Wu | 409/81 |
| 4,671,711 A | * | 6/1987 | Steinbach et al. | 409/82 |
| 5,360,299 A | * | 11/1994 | Oliana | 409/83 |

FOREIGN PATENT DOCUMENTS

| | | | | |
|---|---|---|---|---|
| GB | 1363826 A | * | 8/1974 | |
| GB | 1398795 A | * | 6/1975 | |

* cited by examiner

*Primary Examiner* — Daniel Howell
(74) *Attorney, Agent, or Firm* — Rosenberg, Kleni & Lee

(57) ABSTRACT

A stroke controller is mounted on a key duplicator and has a base, a drive shaft, a knob and a driven shaft. The base has a longitudinal shaft hole and a transverse shaft hole. The drive shaft is mounted rotatably through the transverse shaft hole. The knob is mounted on the drive shaft and has a drive gear. The driven shaft is mounted slidably through the longitudinal shaft hole and has a rack section engaging the drive shaft so that rotating the knob drives the driven shaft to slide relative to the base. The stroke controller precisely controls the movement of an original key and a key workpiece clamped on the key duplicator to manufacture a fine key duplicate.

5 Claims, 5 Drawing Sheets

STROKE CONTROLLER FOR A KEY DUPLICATOR

BACKGROUND OF THE INVENTION

1. Field of the Invention

The present invention relates to a controller, and more particularly to a stroke controller for a key duplicator that allows the key duplicator to precisely process a key workpiece to make a key duplicate.

2. Description of Related Art

A lock is a mechanical or electronic device that is released by a physical object such as a key. Locks provide an inexpensive, though imperfect, method of access control for access to properties like buildings and vehicles and prevent thievery and robbery.

Generally speaking, a key matching the lock has multiple teeth and notches defined between the teeth. Depths of the notches may be different to form a specific combination.

When a conventional duplicating method is applied to duplicate an original key, an operator measures the depths of the notches of the key by naked eyes or rulers and then drills or mills a key workpiece to form the same notches on the workpiece to complete a key copy. However, such method for duplicating a key is imprecise and the notches of the key copy are too inaccurate to open the lock that the original key is capable of opening.

The other conventional key duplicating method uses a key duplication device to copy an original key. The key duplication device has a body and a clamping assembly. The body has a shaft, a probe and a drill bit. The clamping assembly is mounted on the body and has two dampers and a sleeve. The clampers are set opposite to the probe and drill bit. The sleeve is mounted rotatably and slidably around the shaft so that the clamping assembly is capable of rotating and sliding axially on the shaft. A user holds and moves the clamping assembly on the shaft and extends the probe into one of the notches of the original key to detect the depth of the notch and simultaneously drills a same notch in the key workpiece by the drill bit. However, drilling the key workpiece by the handheld clamping assembly is still imprecise. A duplication of the key probably cannot open a corresponding lock.

To overcome the shortcomings, the present invention provides a stroke controller for a key duplicator to mitigate or obviate the aforementioned problems.

SUMMARY OF THE INVENTION

The main objective of the invention is to provide a stroke controller for a key duplicator that allows the key duplicator to precisely process a key workpiece to make a key duplicate.

A stroke controller in accordance with the present invention is mounted on a key duplicator and comprises a base, a drive shaft, a knob and a driven shaft. The base has a longitudinal shaft hole and a transverse shaft hole. The drive shaft is mounted rotatably through the transverse shaft hole. The knob is mounted on the drive shaft and has a drive gear. The driven shaft is mounted slidably through the longitudinal shaft hole and has a rack section engaging the drive shaft so that rotating the knob drives the driven shaft to slide relative to the base. The stroke controller precisely controls the movement of an original key and a key workpiece clamped on the key duplicator to manufacture a fine key duplicate.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
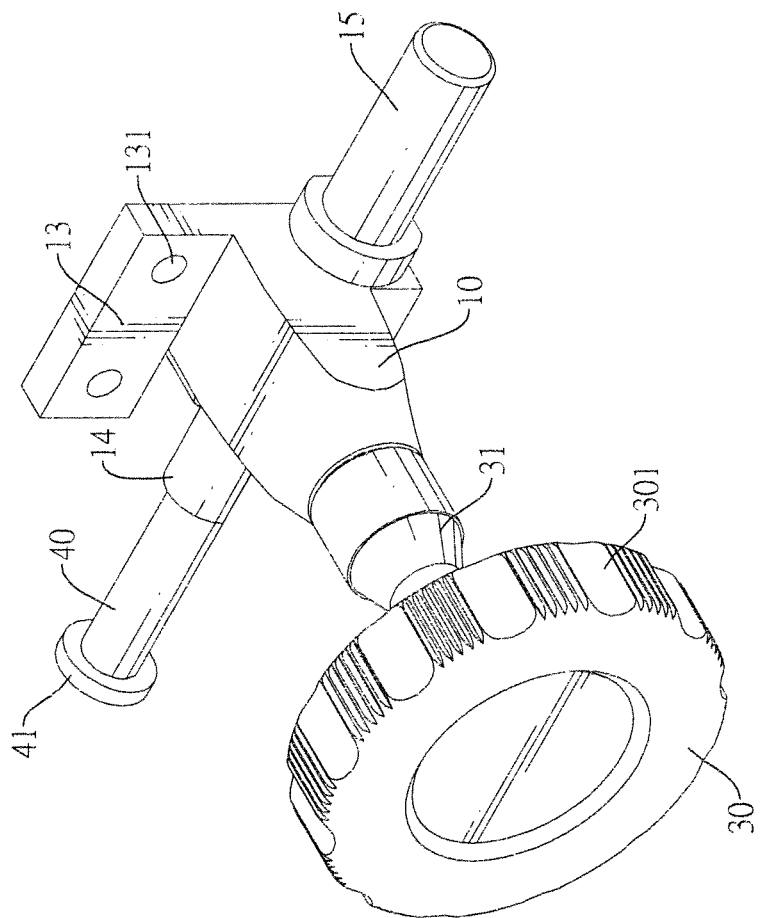
FIG. 1 is a perspective view of a stroke controller for a key duplicator in accordance with the present invention.
Figure 2:
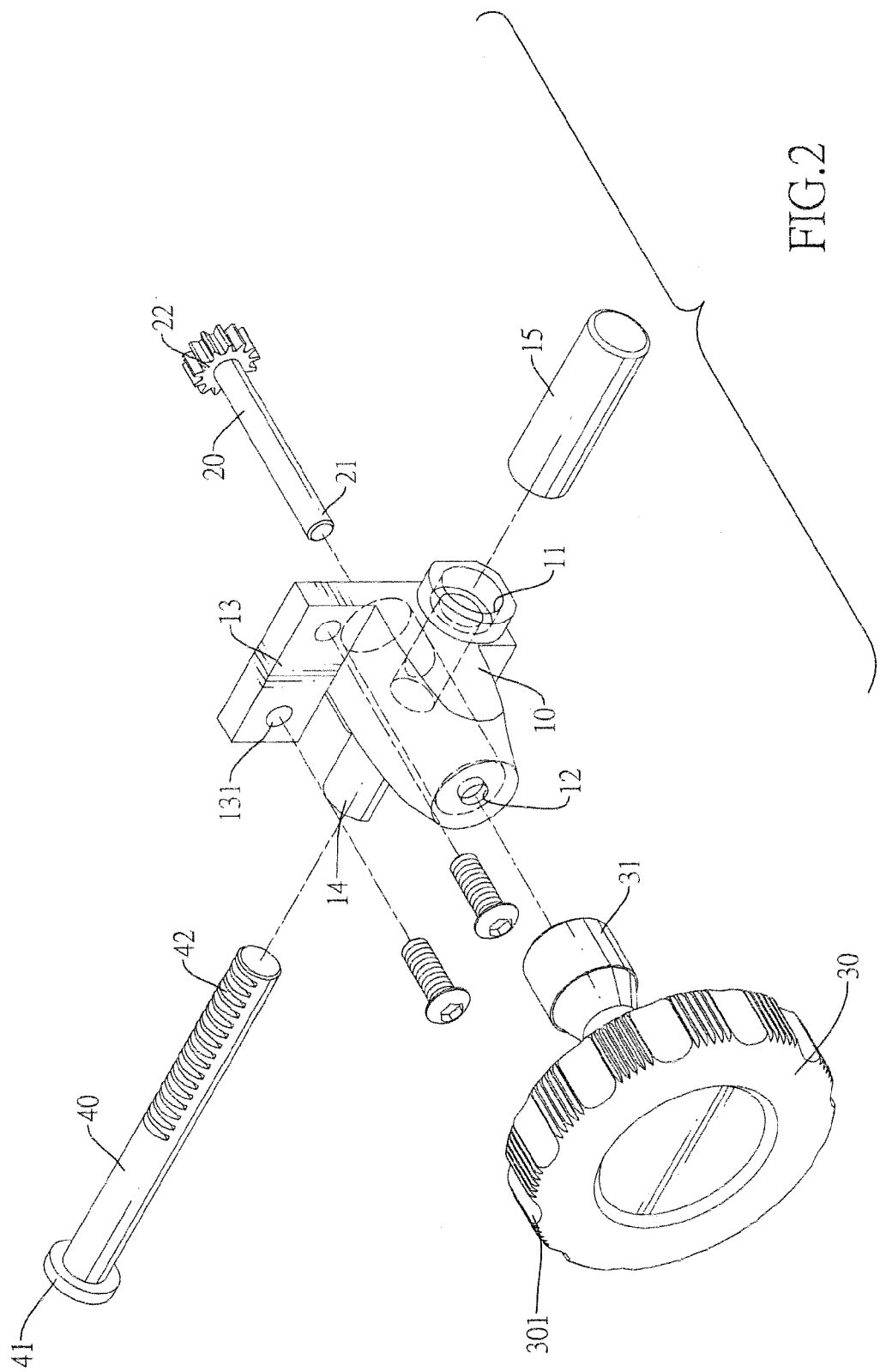
FIG. 2 is an exploded perspective view of the stroke controller in FIG. 1.
Figure 3:
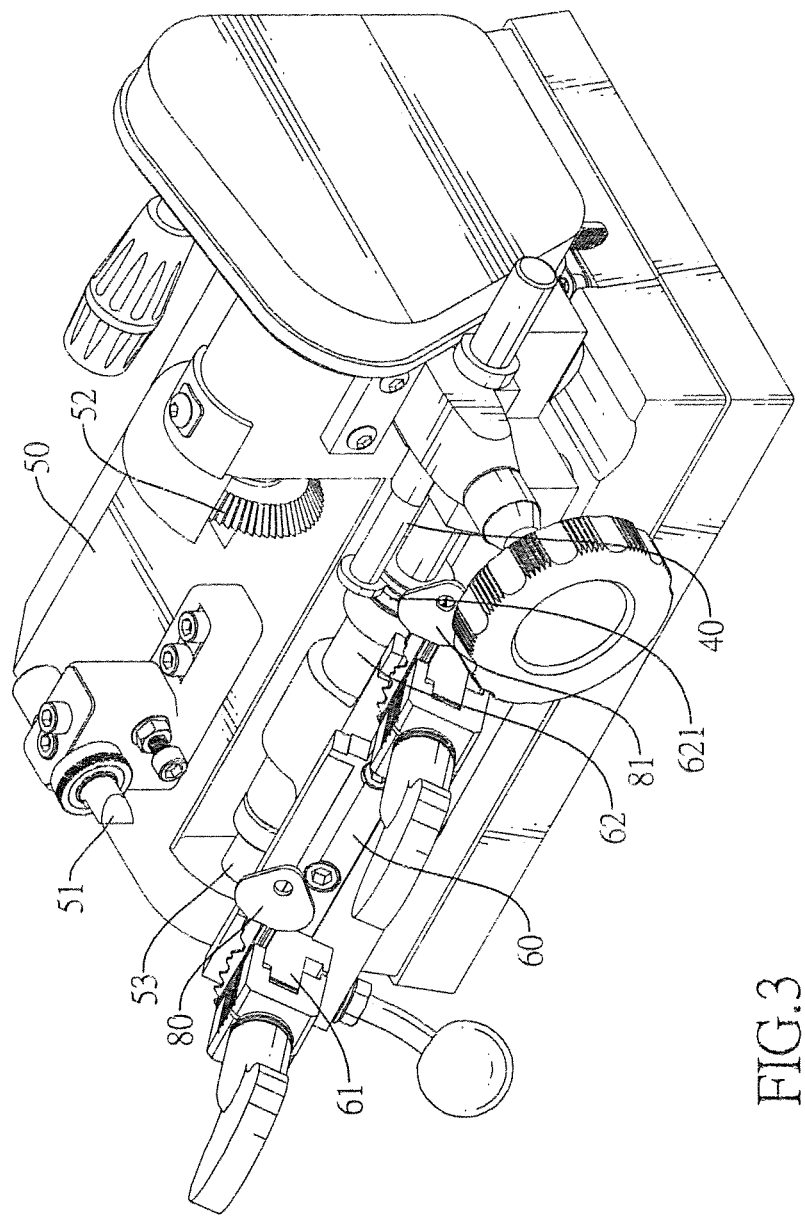
FIG. 3 is a perspective view of the stroke controller in FIG. 1 mounted on a key duplicator.

With reference to FIGS. 1 to 3, a stroke controller in accordance with the present invention is mounted on a key duplicator and comprises a base 10, a drive shaft 20, a knob 30 and a driven shaft 40.

The base 10 is formed into one piece and has a longitudinal shaft hole 11 and a transverse shaft hole 12 and may further have a mounting tab 13, a cover 14 and a protection sleeve 15.

The longitudinal shaft hole 11 is defined through the base 10 and has two ends.

The transverse shaft hole 12 is defined through the base 10 and perpendicularly intersects and communicates with the longitudinal shaft hole 11.

The mounting tab 13 is formed on and protrudes from the base 10 and has multiple mounting holes 131 defined through the mounting tab 13 so that fasteners such as bolts or screws are mounted respectively through mounting holes 13 and fasten the base to the key duplicator.

The cover 14 is curved and is formed on and protrudes longitudinally from one end of the longitudinal shaft hole 11.

The protection sleeve 15 is mounted securely and longitudinally on the other end of the longitudinal shaft hole 11.

The drive shaft 20 is mounted rotatably through the transverse shaft hole 12 of the base 10 and has a connecting end 21, a driving end and a drive gear 22.

The connecting end 21 extends out of the transverse shaft hole 12.

The driving end is opposite to the connecting end 21.

The drive gear 22 is formed on the driving end and has multiple teeth.

The knob 30 may be circular, is mounted on the connecting end of the drive shaft 20 and has an outer edge, a mounting sleeve 31 and multiple skidproof ribs 301.

The mounting sleeve 31 is formed axially on the knob 30 and mounted securely on the connecting end 21 of the drive shaft 20.

The skidproof ribs 301 are formed on the outer edge of the knob 30.

The driven shaft 40 is mounted slidably through the longitudinal shaft hole 11 of the base 10 and has an engaging end, a free end, an engaging element 41 and a rack section 42.

A portion of the driven shaft 40 located near the engaging end may be partially covered by the cover 14.

The free end is opposite to the engaging end and may extend in the protection sleeve 15 of the base 10 so that the free end extends in and is protected by the protection sleeve 15.

The engaging element 41 is formed on the engaging end, may correspond to the cover 14 of the base 10 and may be an engaging flange protruding radially from the engaging end.

The rack section 42 is formed on the driven shaft 40 near the free end and engages the drive gear 22 so that rotating the drive shaft 20 drives the driven shaft 40 to slide relative to the base 10. The rack section 42 has multiple notches arranged longitudinally for engaging the teeth of the gear 22 of the drive shaft 20.

Figure 4:
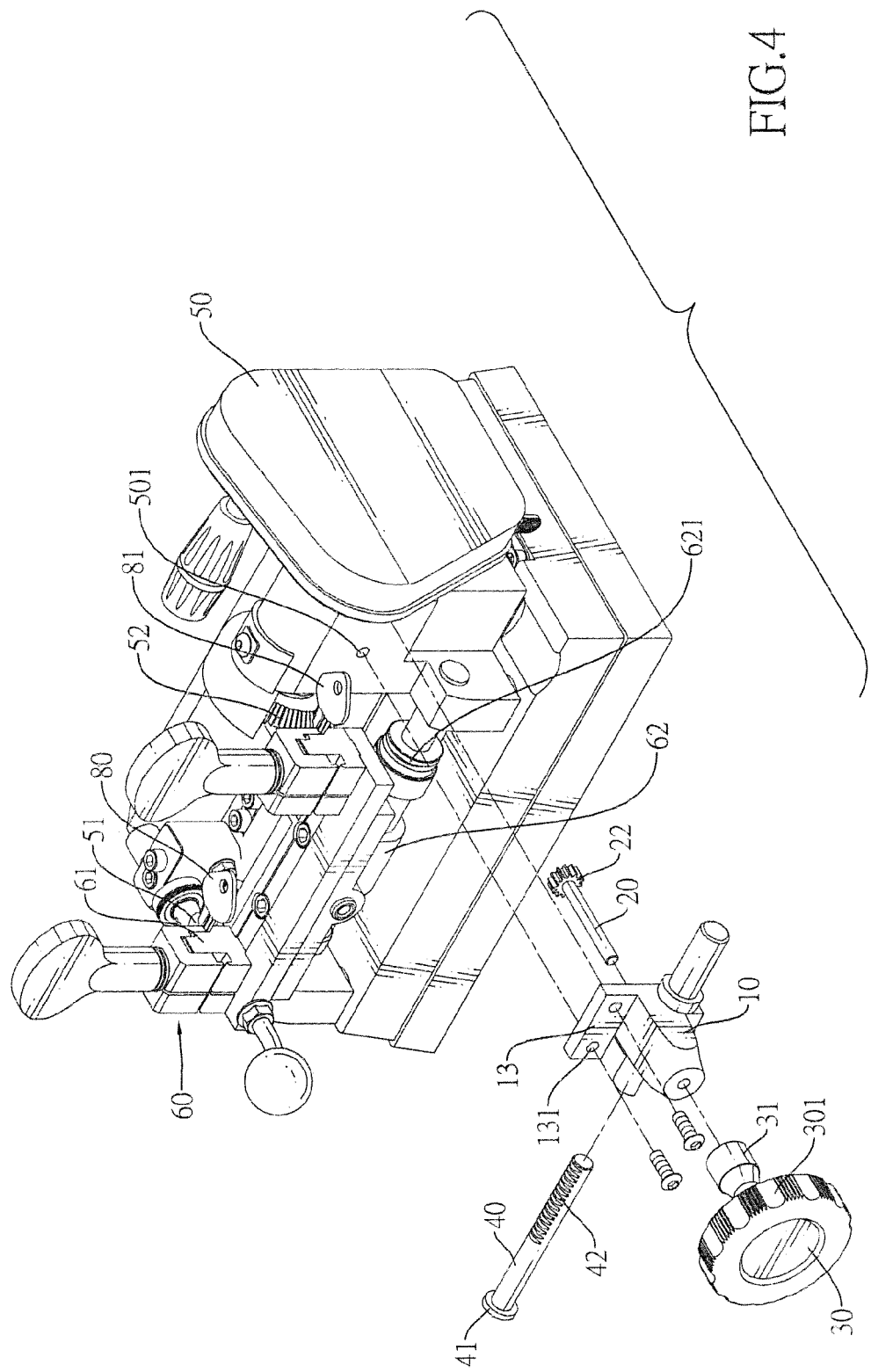
FIG. 4 is a partially exploded operational perspective view of the stroke controller on the key duplicator in FIG. 3.

With further reference to FIG. 4, the key duplicator comprises a body 50 and a clamping device 60.

The body 50 has a probe 51, a grinder 52 and a guide rod 53 and may further have multiple mounting bores 501.

The grinder 52 is mounted on the body 50 and may be a circular grinding disk.

The guide rod 53 is mounted longitudinally on the body 50.

The mounting bores 501 are defined in the body and correspond to the mounting holes 131 of the base 10 of the stroke controller.

The clamping device 60 is mounted pivotally and slidably on the guide rod 53 and has two clamping members 61 and a slide sleeve 62.

The clamping members 61 are mounted on the guide rod 53 and correspond respectively to the probe and the grinder 52. One clamping member 61 corresponding to the probe 51 may clamp and hold an original key 80. The other clamping member 61 corresponding to the grinder 52 may clamp and hold a key workpiece 81. Pivoting the clamping device 60 toward the probe 51 and the grinder 52 makes the original key 80 and key workpiece 81 respectively contact the probe 51 and the grinder 52. The probe 51 extends completely into one of the notches in the original key 80 and the grinder 52 operates to grind the key workpiece 81 to form a same notch thereon.

The slide sleeve 62 is mounted slidably around the guide rod 53, is connected to the clamping members 61, and has an engaging component 621. The engaging component 621 is defined on the slide sleeve 62 and engages the engaging element 41 of the driven shaft 40 and may be an engaging groove engaging the engaging flange. The engagement of the engaging groove and the engaging flange rod allows the driven shaft 40 of the stroke controller to connect to and drive the slide sleeve 62 and clamping members 61 to move along the guide rod 53. Therefore, the stroke controller controls the synchronal movement of the original key 80 and key workpiece 81 to ensure that an arrangement of the notches of the processed key workpiece 81 is identical to that of the original key 80.

Figure 5:
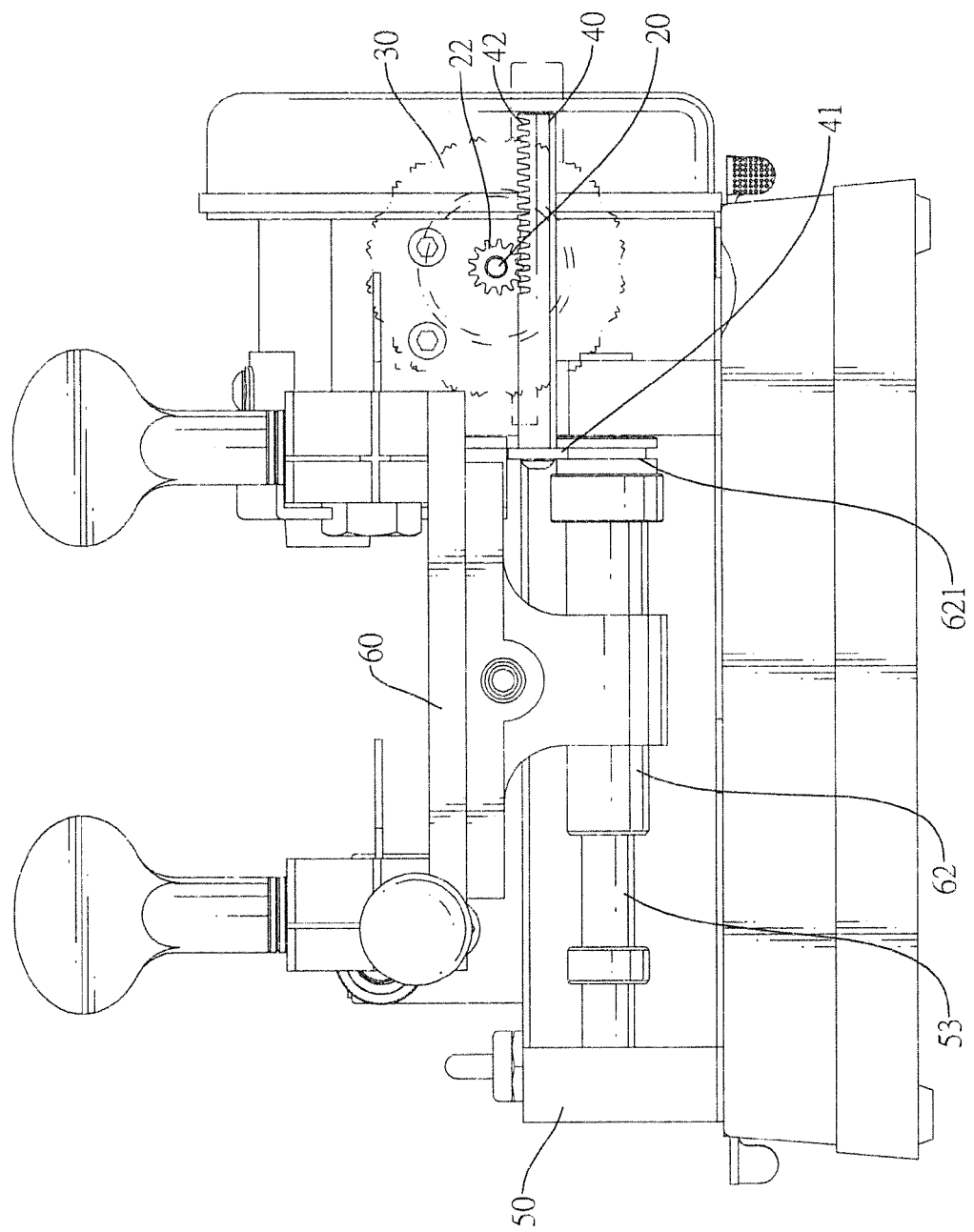
FIG. 5 is an operational side view of the stroke controller on the key duplicator in FIG. 4.

With further reference to FIG. 5, a user holds the knob 30 to rotate the drive shaft 20. The driven shaft 40 is moved by the drive shaft 20 by the engaging drive gear 22 and rack section 42. The clamping device 60 is moved by the driven shaft 40 connected thereto. Therefore, the user precisely controls the 22 movement of the original key 80 and the key workpiece 81 relative to the probe 51 and the grinder 52 by rotating the knob 30. Notches of the key workpiece 81 can be formed accurately.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stroke controller for a key duplicator comprising:
   a base formed into one piece and having
      a longitudinal shaft hole defined through the base and having two ends; and
      a transverse shaft hole defined through the base and perpendicularly intersecting and communicating with the longitudinal shaft hole;
   a drive shaft mounted rotatably through the transverse shaft hole of the base and having
      a connecting end extending out of the transverse shaft hole;
      a driving end being opposite to the connecting end; and
      a drive gear formed on the driving end;
   a knob mounted on the connecting end of the drive shaft;
   a driven shaft mounted slidably through the longitudinal shaft hole of the base and having
      an engaging end;
      a free end being opposite to the engaging end;
      an engaging element formed on the engaging end; and
      a rack section formed on the drive shaft and engaging the drive gear so that rotating the drive shaft drives the driven shaft to slide relative to the base;
   wherein the key duplicator has
      a body having a guide rod mounted on the body; and
      a clamping device mounted pivotally and slidably on the guide rod and having
         two clamping members mounted on the guide rod; and
         a slide sleeve mounted slidably around the guide rod, connected to the clamping members and having an engaging component defined on the slide sleeve and engaging the engaging element of the driven shaft;
   wherein the engaging element of the driven shaft is an engaging flange protruding radially from the engaging end, and the engaging component of the slide sleeve is an engaging groove engaging the engaging flange.

2. The stroke controller as claimed in claim 1, wherein the base further has a mounting tab formed on and protruding from the base and having multiple mounting holes defined through the mounting tab.

3. The stroke controller as claimed in claim 2, wherein
   the base further has a cover being curved and formed on and protruding longitudinally from one end of the longitudinal shaft hole; and
   a portion of the driven shaft located near the engaging end is partially covered by the cover.

4. The stroke controller as claimed in claim 3, wherein
   the base further has a protection sleeve mounted securely and longitudinally on the other end of the longitudinal shaft hole; and
   the free end of the driven shaft extends in and is protected by the protection sleeve.

5. The stroke controller as claimed in claim 4, wherein the knob is circular and has an outer edge and multiple skidproof ribs formed on the outer edge.

* * * * *